United States Patent [19]

Zauner et al.

[11] 4,123,597
[45] Oct. 31, 1978

[54] THERMAL CELLS

[75] Inventors: John H. Zauner, Bloomington; Lyle G. Waller, Clinton, both of Ill.

[73] Assignee: National Union Electric Corporation, Bloomington, Ill.

[21] Appl. No.: 387,019

[22] Filed: Oct. 19, 1953

[51] Int. Cl.² .................................... H01M 6/36
[52] U.S. Cl. ........................................ 429/112
[58] Field of Search ................. 136/90, 103, 107, 112, 136/153.2; 429/112, 199, 103

[56] References Cited

U.S. PATENT DOCUMENTS

| 555,511 | 3/1896 | Jacques | 429/16 |
| 599,044 | 2/1898 | Blumenberg | 15/181 |
| 856,162 | 6/1907 | Kitsee | 340/590 |

Primary Examiner—Leland A. Sebastion
Attorney, Agent, or Firm—Merriam, Marshall & Bicknell

EXEMPLARY CLAIM

1. A thermal cell comprising a metal container, heat source material in said container, said container forming one electrode of said cell, dry electrolyte in contact with the outer surface of said container, and an outer metal shell contacting said electrolyte and separated thereby from said container and constituting another electrode of said cell.

10 Claims, 2 Drawing Figures

INVENTORS
John H. Zauner
BY Lyle G. Waller

THERMAL CELLS

This invention relates to thermal cells.

Thermal cells may be defined as electrochemical power supplies based upon electrolytes of various inorganic salts which remain solid and non-conducting at all storage temperatures. The electrolyte melts and becomes conducting when the cell is heated to some elevated temperature, and electrical energy may then be withdrawn from the system.

A principal object of the invention is to provide a new and improved construction for thermal cells.

Other objects and advantages of the invention will be apparent from consideration of the following specification taken in conjunction with the accompanying drawing of which there is one sheet, and wherein.

Figure 2:
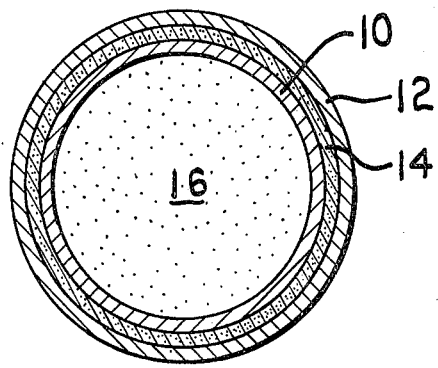
FIG. 2 is a cross sectional view taken along the line 2—2 of FIG. 1.
Figure 1:
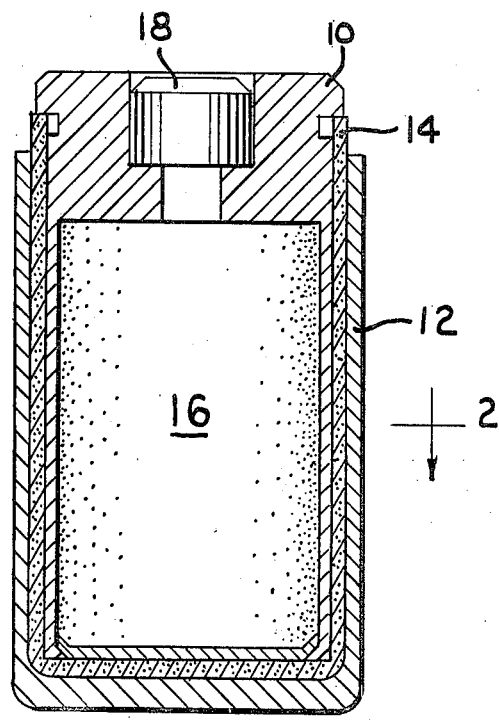
FIG. 1 is a vertical sectional view of a cell embodying the invention.

As illustrated in the embodiment of the invention selected for purposes of illustration, a thermal cell comprises hollow metal members 10 and 12 with dry electrolyte 14 in contact with the outer surface of the member 10 and the inner surface of the member 12, heat source material 16 within the member 10 and a percussion type primer 18 associated with the member 10 and operable for igniting the heat source material therein.

The member 10 as illustrated comprises a shell or container of metal such as nickel-plated brass and forms the cathode of the cell. The heat source material 16 enclosed within the container 10 preferably comprises any material capable of producing, when ignited, a controlled amount of heat without evolution of gaseous combustion products and may comprise a material such as the so-called THERMIT powders which consists of iron oxide and finely divided aluminum or magnesium. The percussion primer 18 may comprise a primer of this type as commonly used in cartridge shells.

The dry electrolyte may for example comprise equal parts by weight of potassium chloride and lithium chloride or any other suitable dry electrolyte. For convenience in manufacture a glass fiber matrix may be impregnated with the electrolyte when the same is in a molten condition. The outer shell or container 12 which forms the anode of the cell may, for example, be magnesium. The cathode is coated with a depolarizing agent such for example as a vanadium oxide ($V_2O_5$).

The primer 18 is mounted in one end of the container 10 so that when it is fired it will ignite the heat source material which in turn will liberate heat due to the combustion thereof. The heat liberated by the heat source material will be transferred by the metal wall of the container 10 to the electrolyte 14 to activate the same.

Cells constructed in accordance with the foregoing disclosure activate rapidly due to the intimate contact of the heat source material with its container 10 because the heat source material is enclosed therein. The electrical properties of such material during and after combustion have no effect on cell operation. While the electrolyte 14 is firmly packed between the nested containers 10 and 12, the heating of the container 10 expands the same thereby improving the contact between the electrode surfaces and the electrolyte. This type of cell construction makes it possible to obtain a capacity per unit volume which greatly exceeds other known thermal cell designs. In addition, the construction herein disclosed lends itself to low cost and easy manufacturing. Furthermore this type of construction makes it possible easily and closely to control the thermal balance of the cell.

Cells according to the foregoing construction have been manufactured with the following characteristics:

Overall nominal dimensions 0.5 inch diameter × 0.75 inch high.
Operating temperature range 400° C.–650° C.
Starting temperature range −65° F. to 165° F.
Life 15 to 30 seconds depending upon temperature and load.
0.3 amperes current available in 0.3 seconds after ignition of the heat source material.
2.0 volts open circuit.
1.8 volts across 5 ohms resistance.
1.6 volts across 2 ohms resistance.

While we have illustrated and described a preferred embodiment of our invention, it is understood that it is capable of modification and, therefore, we do not wish to be limited to the precise details set forth but desire to avail ourselves of such changes and alterations as fall within the scope of the following claims.

We claim:

1. A thermal cell comprising a metal container, heat source material in said container, said container forming one electrode of said cell, dry electrolyte in contact with the outer surface of said container, and an outer metal shell contacting said electrolyte and separated thereby from said container and constituting another electrode of said cell.

2. A cell according to claim 1 including means associated with said container for firing said heat source material to activate said electrolyte.

3. A thermal cell comprising a metal container containing heat source material and forming one electrode of said cell, dry electrolyte in contact with the outer surface of said container, and an outer metal shell contacting said electrolyte and enclosing the same and said container and constituting another electrode of said cell.

4. A thermal cell comprising a metallic member forming one electrode of said cell, a dry electrolyte in contact with the outer surface of said electrode, an outer metal shell contacting said electrolyte and at least partly enclosing said electrode and constituting another electrode of said cell, and means for heating said metallic member to activate said electrolyte.

5. A thermal cell comprising a metallic member forming one electrode of said cell, a dry electrolyte surrounding said electrode and in contact with the outer surface thereof, and an outer metal shell surrounding and in contact with said electrolyte and constituting another electrode of said cell.

6. A cell according to claim 5 including heating means associated with one of said electrodes and operable for heating said electrolyte to activate the same.

7. A thermal cell comprising a mass of heat source material, a positive and negative electrode surrounding said material, a dry electrolyte in contact with and separating said electrodes, said material being in intimate contact with one of said electrodes.

8. A thermal cell comprising heating means, annular positive and negative electrodes disposed in surrounding relation with respect to said means, said means being in intimate contact with one of said electrodes, and dry electrolyte in contact with and separating said electrodes, said heating means being operable upon energization thereof for activating said electrolyte.

9. A thermal cell comprising a metal container containing heat source material and forming one electrode of said cell, a dry electrolyte in contact with the outer surface of said container, and an outer metal shell contacting said electrolyte and enclosing the same and said container and constituting another electrode of said cell, and a percussion type primer associated with said container and operable for igniting the heat source material therein.

10. A thermal cell comprising nested hollow metal members forming electrodes of said cell with a dry electrolyte in contact with and separating the nested surfaces of said members.

* * * * *